July 12, 1960
J. B. BLACK
2,944,314
TANGENTIAL HOSE CLAMP
Filed July 9, 1958
2 Sheets-Sheet 1
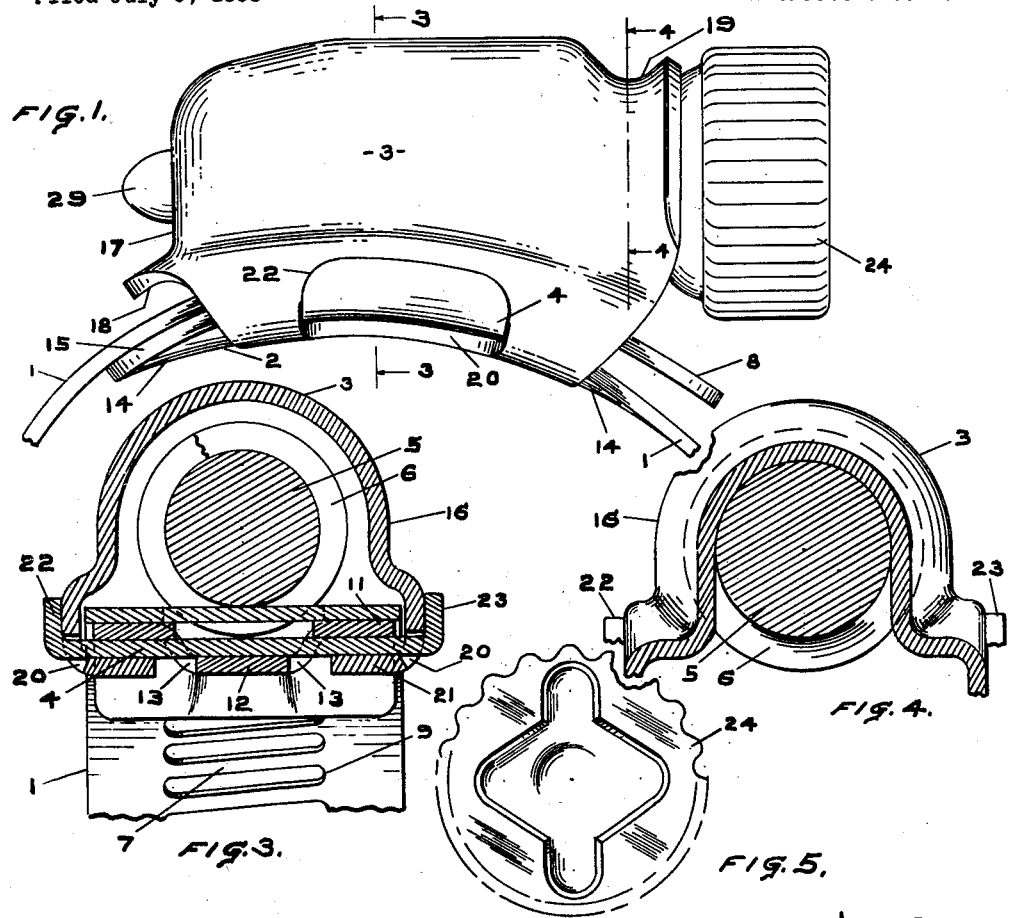
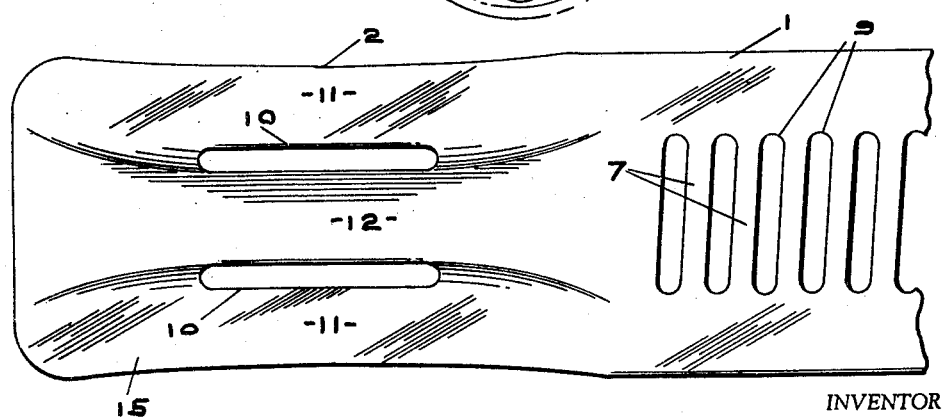
INVENTOR
John B. Black
BY Thomas W. Y. Clark
ATTORNEY July 12, 1960 J. B. BLACK 2,944,314
TANGENTIAL HOSE CLAMP
Filed July 9, 1958 2 Sheets-Sheet 2
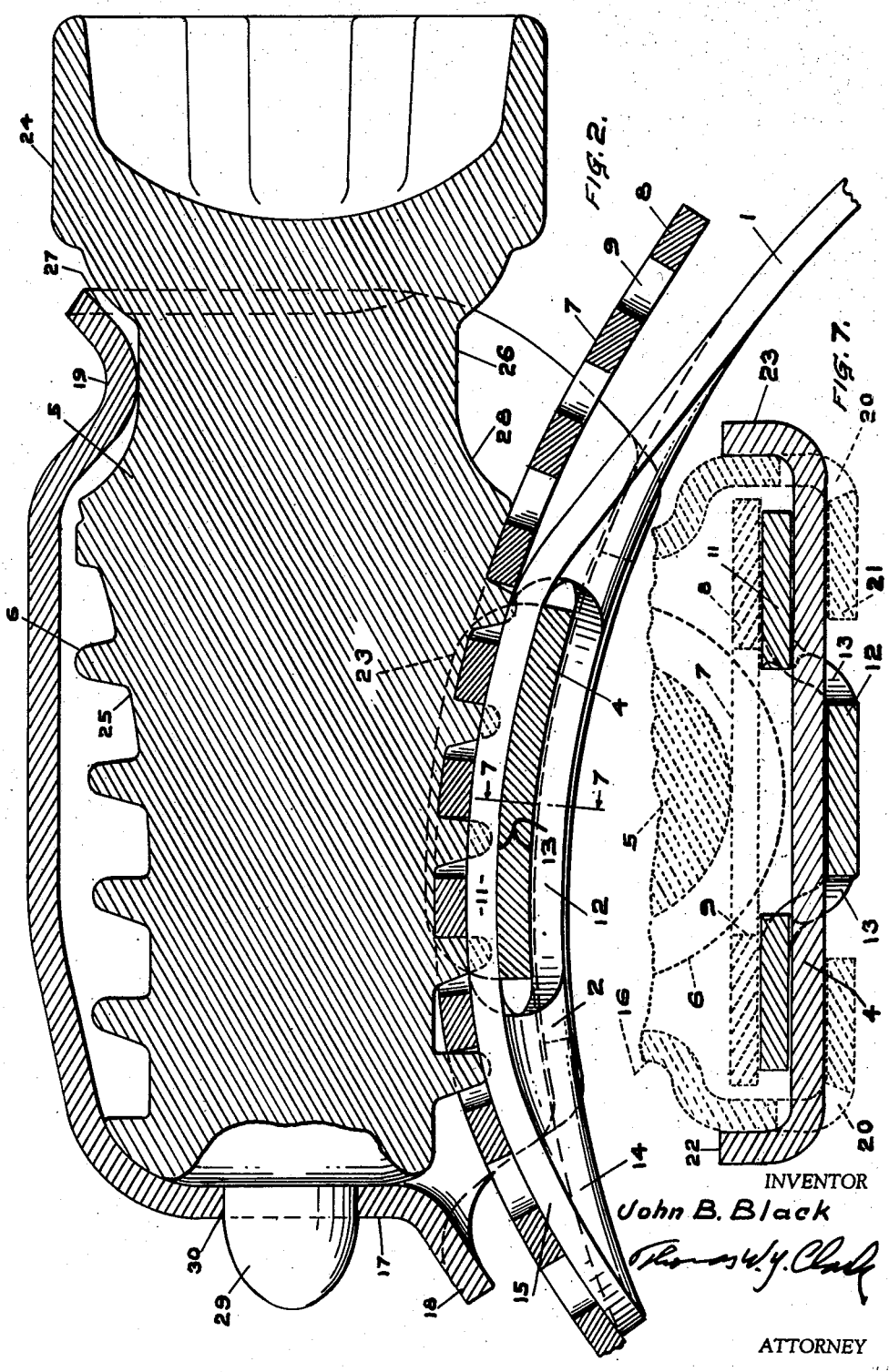
INVENTOR
John B. Black
ATTORNEY

United States Patent Office 2,944,314
Patented July 12, 1960

2,944,314

TANGENTIAL HOSE CLAMP

John B. Black, Berkeley Springs, W. Va., assignor to Murray Corporation, Towson, Md., a corporation of Maryland Filed July 9, 1958, Ser. No. 747,531

9 Claims. (Cl. 24—279)

This invention relates to a hose clamp to maintain a hose on pipes and tubes in automobiles and airplanes and for other similar uses.

The objects of the invention are to produce a strong clamp which may be tightened to an unusual degree and which will hold more firmly after being tightened and which may also be readily loosened. A further object of the invention is to produce a housing for the screw of the clamp which is held on the band by a key which not only firmly holds the housing on the band, but holds the housing from expansion upon rearward thrust of the screw. Another object of the invention is to enlarge the screw, like a cone, near the head and to shape the holding face portions of the screw threads flat, especially those near the screw head, so that the threads of the screw more firmly engage a larger number of bars between openings in the band to increase the strength of the hold of the screw on the band. The partial conical screw shape so divides the load on the band bars as to substantially eliminate binding of the screw in the band. Another object of the invention is to provide the housing at the closed end with a flange, so that the end strengthens the housing to aid it to maintain its rigid position upon the screw. Another object of the invention is to assure complete circumferential pressure, to provide hydraulic sealing of the hose. Another object is to lower a part of the anchored end of the band in the housing to allow the screw threads to pass clear through the openings in the band free end to give those threads a firm grip on the band.

Other objects and advantages of the new clamp will be apparent from the following description and the accompanying drawings forming a part hereof in which:

Figure 1 is a side elevational view of a fragmentary band showing the new housing and screw therein.

Figure 2 is a longitudinal sectional view through the screw and housing showing their co-relationship with the band.

Figure 3 is a transverse sectional view on line 3—3 of Figure 1.

Figure 4 is a similar view on line 4—4 of Figure 1.

Figure 5 is a fragmentary end elevational view of the screw head.

Figure 6 is a fragmentary view of the end of the band before its attachment to the housing.

Figure 7 is a transverse sectional view on line 7—7 of Figure 2 with the housing and screw being shown in dotted lines.

In the drawings similar numerals refer to similar parts throughout the several views.

The hose clamp comprises a band 1 having end 2 attached to the housing 3 by means of a key 4 and a screw 5 extends through the housing and has threads 6 thereon to engage bars 7 in the free end 8 of the band 1 left by cutting slots 9 in the band.

The band is longitudinally slotted as shown at 10 to form outside strands 11 and a center strand 12. The strands 11 are bent upward from the center strand 12 as clearly shown in Figures 2, 3 and 7 to leave an opening 13 therebetween. The center strand 12 follows the curvature of the rest of the band as shown at 14 so that the side strands 11 form a ramp 15 to guide the free end 8 of the band upwardly and through the housing 3.

The housing 3 is formed with sides 16 to contain a screw with reasonable rotating clearance and it has an end wall 17 with a projecting flange or lip 18 thereon to give additional strength to maintain the housing in its proper shape. The other housing end is constricted into a neck portion as shown at 19 which forms a bead at the open end of the housing for the reception of the screw 5 therethrough and the depending sides 16 of the housing are flared outwardly to surround the band 1 and these sides have slots 20 cut therein just above the angle where the lower edges 21 of the sides are bent under the strands 11 of the band 1. In this position these edges 21 are substantially in the same horizontal plane as the lower side of the center strand 12, as shown in Figures 3 and 7.

A transversely extending key 4, having one end 22 bent at right angles to it is inserted through the slots 20 and the openings 13 between the strands of the band and then the other end 23 of the key is bent up to hold the key in place and also to securely hold the housing clamped together on the band and, of course, the key serves its prime purpose to prevent tangential movement of the housing around the band.

The screw 5 has the head 24 which may be turned by several styles of wrenches or a screw driver or with pliers. Threads 6 are preferably formed on a radius to present a flat working surface to as many bars 7 as possible in the tightening of the screw as clearly shown in Figure 2. Toward the head of the screw and from the center, the shape of the screw resembles a cone. This shape primarily gives a larger number of band bar contacts with the valleys 25 between the threads as likewise shown in Figure 2 to greatly increase the strength of the hold of the screw upon the band in the tightening of the screw. The threads pass clear through the openings between bars 7, as shown in Figures 2 and 7.

The screw also has a reduced section 26 between the threads and the head 24 which fits securely within the bead 19 of the housing. The bead 19 is so wide longitudinally of the housing as to prevent its riding between the threads 6 of the screw so that the screw is inserted into the housing after the assembly of the housing upon the band simply by the main force of expanding the housing because of its resilience and the forward slope of the edge of the bead as shown at 27 so that as the screw is inserted the housing expands and permits the insertion after which it contracts again to surround securely the restricted portion of the screw. The enlarged shoulder 28 of the screw contacting the bead 19 holds the screw in releasing the clamp from a hose.

Although it is possible to construct the clamp of this invention without the projecting nose journal 29, it has been found that that journal increases the band tension strength of the clamp considerably. This nose journal 29 goes through opening 30 in the end of the housing.

It will be apparent that many changes may be made in the construction of the housing and screw as well as the band of this invention without departing from what is essential in the invention, which is defined in the following claims.

What is claimed as new and is desired to be secured by Letters Patent is:

1. A tangential screw hose clamp comprising a band adapted to embrace a hose, a tangentially extending housing attached to one end of the band and shaped to receive therethrough the other end of the band, in overlapping relation to the housing attached end, said other end having screw thread receiving bars between openings transversely of the band, a threaded screw in said housing having a head at one end extending in the direction of said other band end and a reduced portion between the head and screw threads, the housing having a wall at the end adjacent the attached band end extending adjacent the band and a bead at the opposite end resiliently expansible and contractible transversely of the screw and closely surrounding said reduced portion of the screw, the bead being wider, axially, longitudinally of the screw, than the thread pitch of the screw, the bead expanding upon insertion of the screw threads therethrough and after insertion because of its resiliency, contracting around the screw reduced portion to securely hold the screw in the housing at all times.

2. The clamp of claim 1 in which the screw has a journal bearing nose at the end opposite the head and the housing wall end has an opening to receive said journal bearing nose therein.

3. The clamp of claim 1 in which the said housing end wall has a flange projecting outwardly therefrom adjacent the said other end of the band as it is threaded through the housing.

4. The clamp of claim 1 in which the screw has a journal bearing nose at the end opposite the head and the housing end wall has an opening therein to receive said journal bearing nose therethrough, and adjacent said other end of the band as it is threaded through the housing, the housing end wall has a flange projecting outwardly thereon.

5. The clamp of claim 1 in which the axis of the screw is substantially tangential to the band and the screw end adjacent the reduced portion of the screw is increased in diameter to present more screw threads to the band bars between the openings when the band is curved on a hose in use.

6. A tangential screw hose clamp comprising a band adapted to embrace a hose, having a housing end and a threading end having in the threading end screw thread receiving bars between openings transversely of the band, the band at the housing end being longitudinally slit adjacent but spaced from said housing end into two outer side strands and a central strand, the central strand being curved regularly in line with the band and the outer side strands extending radially outwardly therefrom, forming an opening between the center and outer side strands, a housing extending longitudinally of the band having a screw receiving central portion and depending sides extending under the band at the side extremities, the housing sides having openings adjacent but spaced from the bent under lower side extremities of the housing, a key passing through said housing side openings and the opening between the strands, the ends of the key being bent around the housing sides to hold them securely together and a screw in said housing, the threads of which engage the bars of the band threading end.

7. The clamp of claim 6 in which the key ends are bent upwardly toward the screw receiving central portion of the housing.

8. The clamp of claim 6 in which the housing end adjacent the attached band end has a depending transverse wall extending adjacent the band and a flange on the wall edge projecting outwardly from the wall.

9. The clamp of claim 6 including on said screw a head at one end extending in the direction of the threading end of the band and a reduced portion between the head and screw threads, the housing having a wall at the end adjacent the attached band end extending adjacent the band and a bead at the opposite end resiliently expansible transversely of the screw and closely surrounding said reduced portion of the screw, the bead being wider, longitudinally of the screw, than the thread pitch of the screw, the bead expanding upon insertion of the screw threads therethrough and after insertion because of its resiliency, contracting around the screw reduced portion to securely hold the screw in the housing at all times.

References Cited in the file of this patent
UNITED STATES PATENTS

| | | |
|---|---|---|
| 2,395,273 | Hill et al. | Feb. 19, 1946 |
| 2,767,455 | Schaefer | Oct. 23, 1956 |
| 2,820,276 | Clauss et al. | Jan. 21, 1958 |

FOREIGN PATENTS

| | | |
|---|---|---|
| 518,467 | Belgium | Apr. 15, 1953 |
| 677,749 | Great Britain | Aug. 20, 1952 |
| 745,123 | Great Britain | Feb. 27, 1956 |